(12) United States Patent
Westbrook

(10) Patent No.: US 9,435,942 B2
(45) Date of Patent: Sep. 6, 2016

(54) METHOD OF OPTIMIZING MULTICORE OPTICAL FIBER AND DEVICES UTILIZING SAME

(71) Applicant: OFS FITEL, LLC, Norcross, GA (US)

(72) Inventor: Paul S Westbrook, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/405,306

(22) PCT Filed: Jun. 21, 2013

(86) PCT No.: PCT/US2013/047193
§ 371 (c)(1),
(2) Date: Dec. 3, 2014

(87) PCT Pub. No.: WO2013/192597
PCT Pub. Date: Dec. 27, 2013

(65) Prior Publication Data
US 2015/0147025 A1  May 28, 2015

Related U.S. Application Data

(60) Provisional application No. 61/662,437, filed on Jun. 21, 2012.

(51) Int. Cl.
*G02B 6/02* (2006.01)
*H01S 3/067* (2006.01)

(52) U.S. Cl.
CPC ....... *G02B 6/02042* (2013.01); *H01S 3/06708* (2013.01); *H01S 3/0675* (2013.01); *H01S 3/06737* (2013.01); *Y10T 29/49* (2015.01)

(58) Field of Classification Search
CPC ................. G02B 6/02042; H01S 3/06708
USPC .......................................... 385/126
See application file for complete search history.

(56) References Cited

U.S. PATENT DOCUMENTS

2011/0052129 A1* 3/2011 Sasaoka ................. 385/126
2012/0195563 A1* 8/2012 Takenaga et al. ........... 385/126

OTHER PUBLICATIONS

T.A. Birks, et al., "Photonic lantern" spectral filters in multi-core fibre, Jun. 18, 2012/vol. 20, No. 13/ Optics Express 13996-14008.
Manuel Silva-López, et al., Transverse load and orientation measurement with multicore fiber Bragg gratings, Applied Optics/vol. 44, No. 32/ Nov. 10, 2005, 6890-6897.

(Continued)

*Primary Examiner* — Ryan Lepisto
(74) *Attorney, Agent, or Firm* — Kane Kessler

(57) ABSTRACT

A method of designing multicore optical fibers is provided. A geometry for the core arrangement is selected. At least one of i) core width, ii) core position with respect to other cores, or iii) orientation with respect to incoming, outgoing, or at least partially traversing radiation such as an inscription beam are optimized. A design space is created in which no core shadows or blocks any other core with respect to incoming, outgoing, or at least partially traversing radiation. Optimization generally includes tracing tangents of core widths against an orthogonal axis and ensuring no overlap of space between said tangents on said axis. For twisted fiber, optimization also includes optimizing effective length and twist rate of the fiber. Devices entailing such fibers, such as multicore pump coupler and multicore fiber distributed feedback laser, are also contemplated.

9 Claims, 18 Drawing Sheets

(56) References Cited

OTHER PUBLICATIONS

Amanda Fender, et al., Dynamic two-axis curvature measurement using multicore fiber Bragg gratings interrogated by arrayed waveguide gratings, Dec. 20, 2006 / vol. 45, No. 36 / Applied Optics, 9041-9048.

Charles G. Askins, et al., Inscription of Fiber Bragg Gratings in Multicore Fiber, © 2007 OSA/BGPP 2007.
G.M.H Flockhart, et al., Two-axis bend measurement with Bragg gratings in multicore optical fiber, Mar. 15, 2003 / vol. 28, No. 6 / Optics Letters, 387-389.

* cited by examiner

METHOD OF OPTIMIZING MULTICORE OPTICAL FIBER AND DEVICES UTILIZING SAME

RELATED APPLICATIONS

Priority is claimed from U.S. Provisional Patent Application No. 61/662,437, filed Jun. 21, 2012, entitled "Optimization of Multicore Fiber Design for Grating Inscription", the teachings of which are incorporated by reference herein.

BACKGROUND OF THE INVENTION

1. Field of the Invention

The invention is directed to multicore optical fibers. More specifically the invention is directed to methods of designing multicore optical fibers in which every core can be inscribed or addressed simultaneously without blocking adjacent or other cores.

2. Description of Related Art

Multicore fiber gratings are well known. They have been used in fiber sensors for bend and shape, for example. It would useful to use such gratings in other applications such as telecom and multicore fiber lasers. However, such gratings are more demanding. They require well controlled exposure over a long length of fiber. Moreover it is most important to be able to fabricate gratings in parallel in multiple cores since this would greatly increase yield for densely integrated multicore fiber devices employing fiber gratings.

The prior art considers fibers with a limited number of cores, typically four or fewer. In order to scale fiber designs to more than four cores the fiber design must be adjusted. Moreover the precise orientation of the fiber must also be adjusted for optimal exposure of all cores. Such optimization is particularly important in round silica fibers, since these fibers exhibit lensing of the incoming light. Such fiber designs and fiber orientations and their use in parallel fabrication of multicore fiber gratings have not been disclosed.

Some areas of interest for multicore fibers include image transmission, telecommunications, sensing, and fiber lasers. Recent results have shown the possibility of long distance propagation of spatially multiplexed telecom signals with low cross talk over seven core fiber. MCFs have been used as sensors of temperature, and strain, as well as fiber bend and shape. Nonlinear effects, including switching in dual core fibers have been examined. Multicore rare earth doped gain fiber with various geometries has been demonstrated. Coupled twin core fibers have been considered for Er doped amplifiers and lasers. Fiber lasers operating on a supermode of many coupled cores have been proposed and demonstrated. Gain fibers with uncoupled core geometries have also been considered. These designs are motived by the desire for increased integration in telecommunications, sensing and fiber lasers. Improved diode pump coupling and scaling of fiber laser output power has been demonstrated in multicore ribbon fibers. Seven core hexagonally arrayed Er doped fibers have been applied to telecom signal amplification with low cross talk among the cores.

While past work has shown multicore lasing and amplification, these results have typically employed fused fiber and bulk optic components for filtering or to construct laser cavities. There is comparatively little work reported on multicore fiber Bragg gratings (MCFBGs) as components in integrated multicore fiber sources. Multicore fiber gratings have been demonstrated in many of the above fiber sensors, however such gratings are typically less demanding than FBGs used for fiber lasers. For instance, fiber distributed feedback (DFB) lasers require well controlled holographic inscription of intra-core index modulation over lengths of cms with a precisely placed it phase shift to define the cavity. In single core fibers, it is well known that fiber DFB lasers can exhibit sub MHz linewidths. Extension of narrow linewidth fiber DFBs to multicore fibers could impact multicore fiber sensing applications, particularly those using interferometric or RF interrogation. Precision MCFBG fabrication could also impact the development of compact high brightness multicore fiber lasers. Moreover, if such gratings could be fabricated in parallel in all cores of a multicore fiber, an important efficiency in fabrication would be realized. Scaled fabrication and assembly of multicore fiber devices is an important driver for research into multicore fiber technologies, since it offers the possibility of reduced cost and size in next generation fiber components that require dense integration of many fiber cores.

Accordingly, there is a long felt-need in the art to provide a method of designing multicore optical fibers, e.g., having seven or more cores, in which all of the cores are able to be inscribed with gratings or the like simultaneously with a single inscription beam and/or addressed simultaneously with a single addressing beam. There are also long-felt needs to provide optical fibers so designed, and devices such as lasers and pump couplers utilizing optical fibers so designed.

SUMMARY OF THE INVENTION

The invention includes a method of designing multicore optical fibers. The steps of the inventive method include: a) selecting a geometry for the core arrangement; and b) optimizing at least one of i) core width, ii) core position with respect to other cores, or iii) orientation with respect to incoming, outgoing, or at least partially traversing radiation (e.g., an inscription beam or beams, an addressing beam, a pump beam, an incoming plane wave or waves, a Gaussian wave, and the like. This is more clearly defined in the discussion of the examples shown in the Figures). Steps a) and b) are performed to generate at least one core design in which no core shadows or blocks any other core with respect to incoming, outgoing, or at least partially traversing radiation. The optimizing step further includes the steps of i) tracing tangents of core widths against an orthogonal axis and ii) ensuring no overlap of space between said tangents on said axis. Optionally, for twisted fiber, the effective length of the fiber having no such shadowing and the twist rate of the fiber are also optimized.

One design selectable by the above optimization method includes a hexagonal array of cores, optionally comprising seven cores in one embodiment and 19 cores in another.

The geometry selecting step may further include the step of selecting a substantially symmetric core array geometry to reduce the optimization step to optimizing i) core width/ core spacing, and ii) angle of orientation of core array with respect to incoming, outgoing, or at least partially traversing radiation.

As part of the inventive method, the index of refraction of a medium surrounding the fiber may be selected as a function of the index of refraction of fiber. In one embodiment, the surrounding index of refraction is matched to the fiber index of refraction, thereby causing incoming radiation to pass through the fiber substantially unrefracted. In another embodiment, the surrounding index of refraction is coordinated with the fiber index of refraction so as to cause lensing such that any traversing radiation passes through each core only once and so that no core blocks or shadows any other core.

The invention also includes a multicore pump coupler having at least one multicore optical fiber designed in accordance with the above-described methods.

The invention also includes a multicore fiber distributed feedback laser having at least one multicore optical fiber designed in accordance with the above-described methods.

The invention also includes a multicore optical fiber designed in accordance with the above-described methods. Other embodiments describe a multicore fiber device utilizing at least one multicore optical fiber designed in accordance with the above-described methods.

DETAILED DESCRIPTION OF THE INVENTION AND DRAWINGS

Description will now be given with reference to the attached FIGS. 1-16. It should be understood that these figures are exemplary in nature and in no way serve to limit the scope of the invention, which is defined by the claims appearing herein below.

The invention contemplates fiber designs that allow for placement of multiple cores in a fiber with core radius and core spacing designed to allow exposure of all cores with no shadowing of any of the cores by other cores. A particular geometry for the core arrangement is chosen, either symmetrical or not. The core spacings, core offsets, and orientation with respect to incoming, outgoing, or at least partially traversing radiation are then optimized to yield a design in which no core shadows or blocks any other core with respect to incoming, outgoing, or at least partially traversing radiation. Such optimization will yield a design space of many core spacings, radii and beam orientations. Such a space allows for further optimization of other parameters required in the fiber application as will be described below. One embodiment discussed below includes a fiber with hexagonally arrayed cores, in which the optimal orientation of such a fiber is determined for minimal shadowing. The core radius and spacing are also optimized to yield no shadowing. This optimization then shows the design space for such a fiber.

In the below description, all references to incoming radiation are to be considered to include outgoing or at least partially traversing radiation as well.

Figure 1:
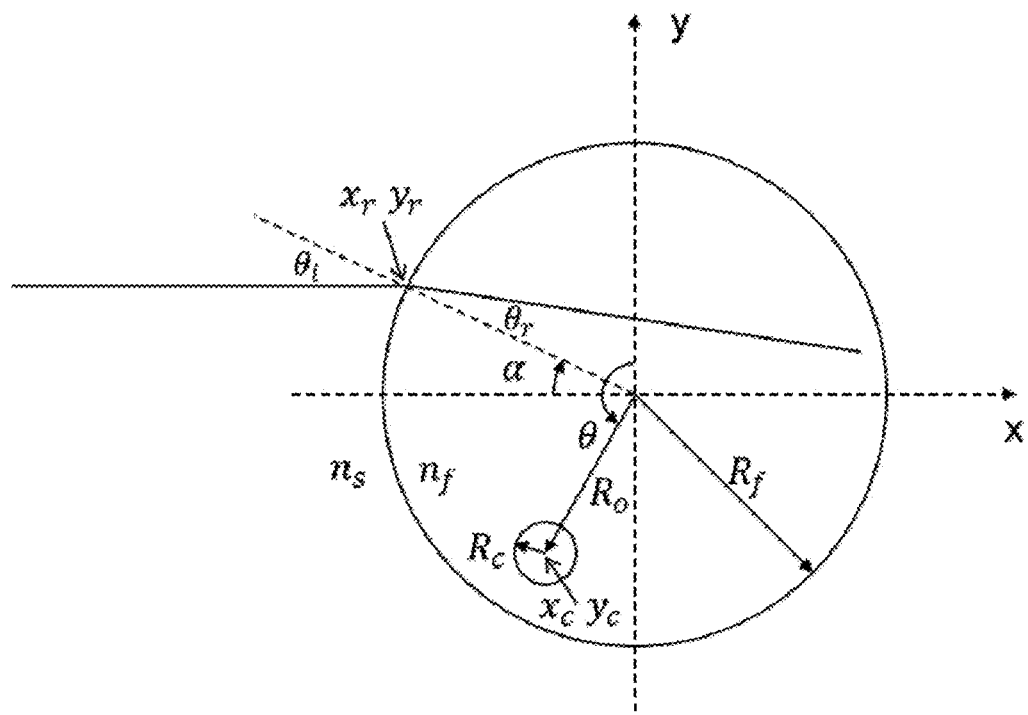
FIG. 1 is a schematic of light ray refracting at fiber surface (solid lines) in accordance with the invention. Also shows core circle inside fiber. All angles and dimensions used in calculations are shown.

With reference to FIG. 1, an estimate of the shadow resulting from one core onto another in a multicore fiber during side exposure writing of gratings may be obtained using ray tracing. In this approach one first computes the rays inside the fiber given an incoming plane wave. Then one computes the tangents of these rays with cores placed internally inside the fiber to obtain the angles at which shadowing of one core on another occurs.

To start, we refer to the diagram in FIG. 1. An incoming plane wave ray is refracted at the entry point $x_r$, $y_r$. This entry point can be expressed as $$x_r = -R_f \cos \alpha \tag{1}$$

$$y_r = R_f \sin \alpha \tag{2}$$

Where $R_f$ is the fiber radius (and taken as positive), and $\alpha$ is the radial angle.

The incident and refracted angles for this beam are related by:

$$n_s \sin \theta_i = n_f \sin \theta_r = n_z \sin \alpha \tag{3}$$

Where $n_s$ and $n_f$ are the surround and fiber refractive indices, respectively. The last expression results from the equality $\theta_i = \alpha$. With these definitions, the equation for a ray is:

$$y(x) = m(x - x_r) + y_r \tag{4}$$

or $$y(x) = mx + y_o \tag{5}$$

With slope m:

$$m = \tan(\delta_r - \alpha) \tag{6}$$

And intercept:

$$y_o = -m x_r + y_r \tag{7}$$

Figure 2:
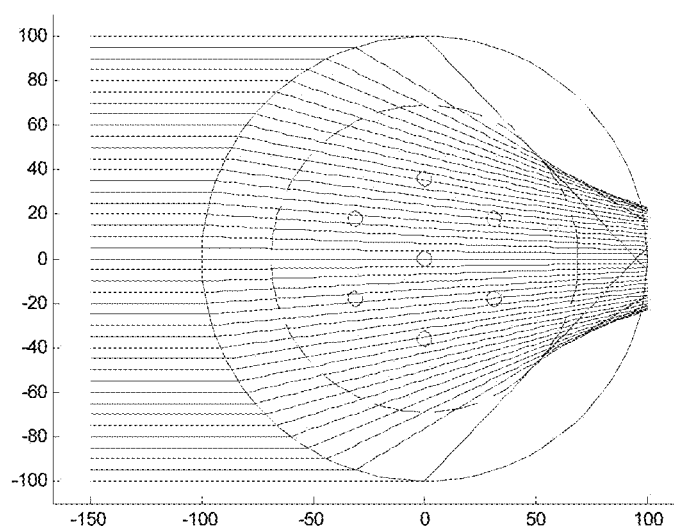
FIG. 2 is a schematic showing rays refracting at fiber surface of seven core fiber in accordance with the invention. Dashed circle is maximum radius for light propagation after lensing.

An example of a set of rays is given in FIG. 2. This figure also shows a dashed circle which defines the radius beyond which lensing prevents light from propagating. This radius may be derived from the tangency condition of the ray with largest $\alpha$. This radius is:

$$R_{max} = \frac{n_s R_f}{nf}.$$

(This solution may also be obtained by computing the ray tangent condition for a circle centered at the origin with the largest possible radius using the analysis below.)

To determine if a given ray is intersecting a core inside the fiber one must solve for the intersection points of the ray and a circle within the fiber. These two equations may be written as:

$$y = mx + y_o$$

$$(y - y_c)^2 + (x - x_c)^2 = r^2 \tag{8}$$

Where r is the radius of the core circle and $y_c$ and $x_c$ are the center coordinates. The roots of this equation can be obtained by solving a quadratic equation:

$$\{m^2 + 1\}x^2 + \{2m(y_o - y_c) - 2x_c\}x + (y_o - y_c)^2 + x_c^2 - r^2 = ax^2 + bx + c = 0 \tag{9}$$

The roots of this equation are given by the quadratic formula and will be either two real numbers, or two complex numbers depending on the value of the discriminant $b^2 - 4ac$. When the roots are real, the ray passes through the circle and there are two intersection points. When the roots are complex, the ray does not pass through the circle. When the discriminant is zero, the roots are degenerate and the ray is tangent to the circle. This is the condition which is necessary to define the boundary of a shadow. We therefore want to relate the circle and ray parameters in the case when $b^2 - 4ac = 0$. After some simplifications, this relationship may be expressed as:

$$(m x_c + y_o - y_o)^2 - (m^2 + 1) r^2 = 0 \tag{10}$$

When this equation is satisfied, the ray is tangent to the circle.

We want to know at what orientation angle $\theta$ a given core will cast a shadow on another core. The range over which this occurs starts and ends when one of the rays is tangent to both circles. We must therefore solve the following nonlinear system of equations:

$$(m x_{c1} + y_o - y_{c1})^2 - (m^2 + 1) r^2 = 0$$

$$(m x_{c2} + y_o - y_{c2})^2 - (m^2 + 1) r^2 = 0 \tag{11}$$

Where the circles have the same radius r and different centers $\{x_{c1}\ y_{c1}\}$ and $\{x_{c2}\ y_{c2}\}$.

In a seven core fiber, the core centers are given by:

$$x_o = -R_o \sin(\theta + \chi)$$

$$y_o = R_o \cos(\theta + \chi) \tag{12}$$

Where $R_o$ is the offset of the core center and $\chi = N\pi/3$ is a multiple of $\pi/3$. The center core has $R_o = 0$ and $\chi = 0$.

Solution of these equations gives values of $\alpha$ and $\theta$ for which the incoming ray is tangent to both core circles. Note that this can happen for eight different values of $\theta$. Four of these are shadowing of one core and four shadowing of the other core. Within each four solutions, only the outer two correspond to the boundary of the shadows. The inner two correspond to a double tangent point occurring within a shadow.

To obtain solutions to these equations a numerical solver may be used. Such a solver requires appropriate starting points to obtain the different solutions. These may be obtained by computing the magnitude of the discriminant vector over the range of $\alpha$ and $\theta$ being considered. That is:

$$D(\alpha, \theta) = \left| \begin{matrix} (m(\alpha) x_{\sigma 1}(\theta) + y_\sigma(\alpha) - y_{\sigma 1}(\theta))^2 - (m(\alpha)^2 + 1)\gamma^2 \\ (m(\alpha) x_{\sigma 2}(\theta) + y_\sigma(\alpha) - y_{\sigma 2}(\theta))^2 - (m(\alpha)^2 + 1)\gamma^2 \end{matrix} \right|^2 \tag{13}$$

Where the dependence on $\alpha$ and $\theta$ is given explicitly. For a given grid of $\alpha$ and $\theta$ values, D will become low near the zeros of the system of equations. By recording the $\alpha$ and $\theta$ values for D below some threshold value $D_{threshold}$, a set of initial guesses may be obtained. There may be more than 4 initial guess points. These are then used with the numerical solver to obtain accurate solutions from each guess. The result is that the many initial guesses will all converge to one of the four (or eight) solutions.

In order to solve for the shadows of one core on another, the ranges of $\alpha$ and $\theta$ must be restricted. With the conventions shown in FIG. 1, one uses $$-\frac{\pi}{2} < \alpha < \frac{\pi}{2}$$

since the rays all come from the left, and one restricts $\pi < \theta < 2\pi$ since the core must be on the right half of the fiber circle to be in a shadow.

Figure 3:
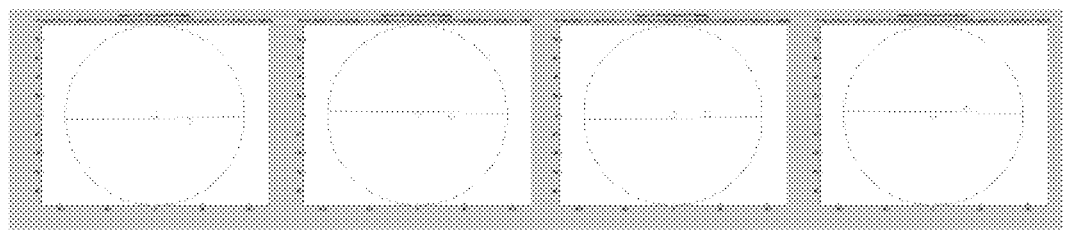
FIG. 3 is a schematic of four orientations with a ray tangent to two cores. Only the far left and far right define the shadow.

To illustrate the solutions, we show the four solutions for the shadowing of an outer core by the center core in FIG. 3.

While all four cases have a ray with two tangents, only the two extreme cases define the start and finish of a shadow.

We now apply these results to the case of a twisted fiber with seven cores. The geometry of this fiber is similar to that in FIG. 2. In this case every core will exhibit shadows along the fiber as the core twist in and out of the shadows. FIG. 4 shows the shadowing of the center core by the outer cores. FIG. 5 shows the shadowing of an outer core by the other cores. The minimum and maximum observed in the shadow result from Fresnel diffraction off of the partially opaque cores. In FIG. 5 there are five shadows since the center core aligns with one of the outer cores for one of the shadows. In both figures, the region in yellow is the geometric shadow computed using Eqs. 11.

Figure 4A:
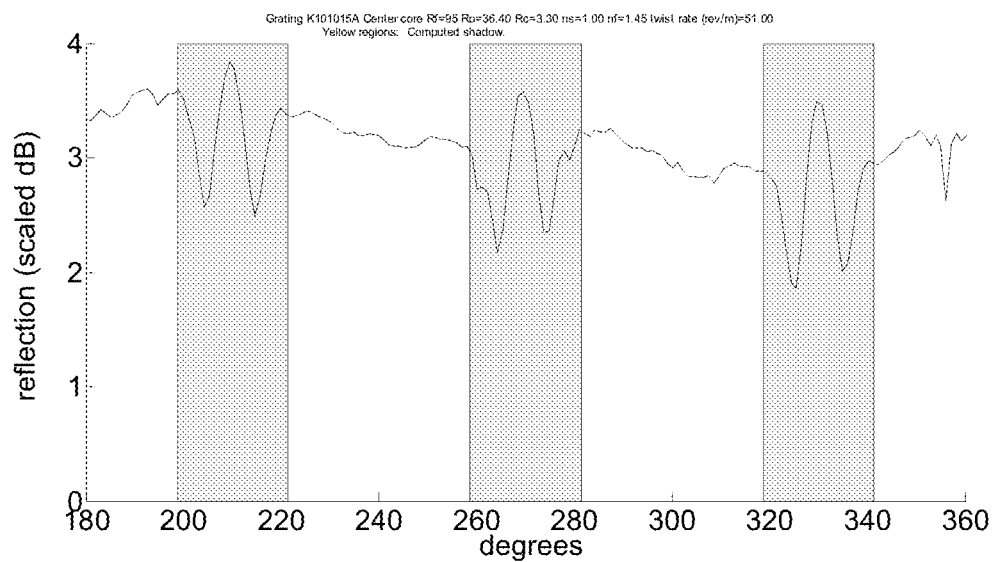
FIG. 4A is a graph showing center core reflection versus orientation angle showing shadows from outer cores as fiber orientation twists.
Figure 4B:
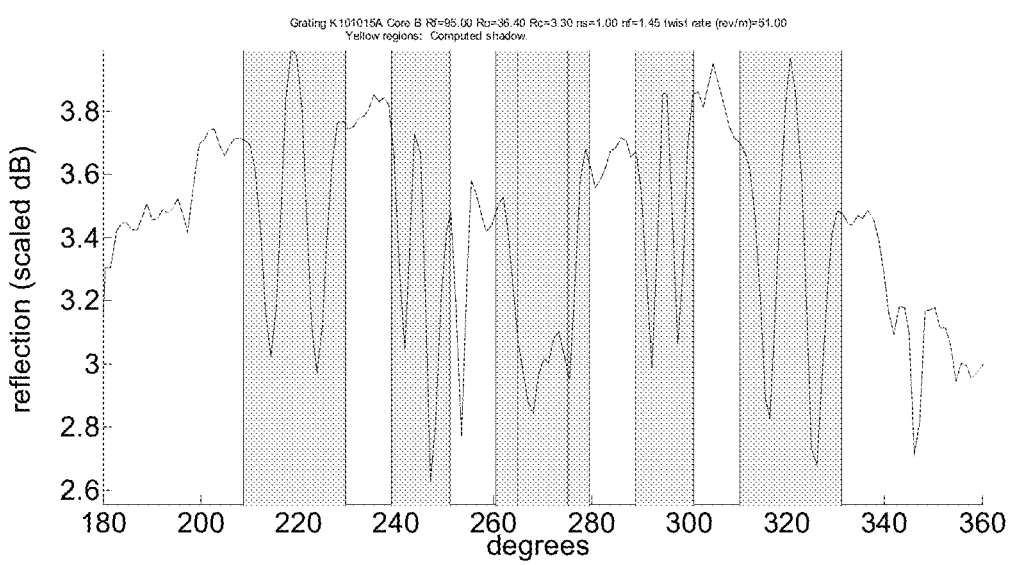
FIG. 4B is a graph showing outer core reflection showing five shadows from all cores. Two of the shadows overlap when θ=270°. Shaded regions are the geometric shadows computed using Eqs. 11.

For FIGS. 4A-B, the following were assumed: $R_f=95$ $R_o=36.4$ $R_c=3.3$ $n_s=1$ $n_f=1.45$. The position of grating features was converted to angle with twist rate=51 turns/m.

As another example, one may compute the best orientation for the fiber so that all cores will be exposed in side inscription without shadowing. For the case of $n_s=1$ $n_f=1.45$, This orientation is that given in FIG. 2. In this case we took $R_f=148/2$ $R_o=41$ $R_c=3.2$ $n_s=1$ $n_f=1.45$. The only open aperture (or no shadowing condition) of the cores on the right half of the fiber occurs at the symmetric position. The open aperture may be computed by overlapping the shadow patterns for two cores on the right side of the circle in FIG. 2. For a core circle that started at $\theta=0$, this orientation corresponds to 300°.

Figure 5A:
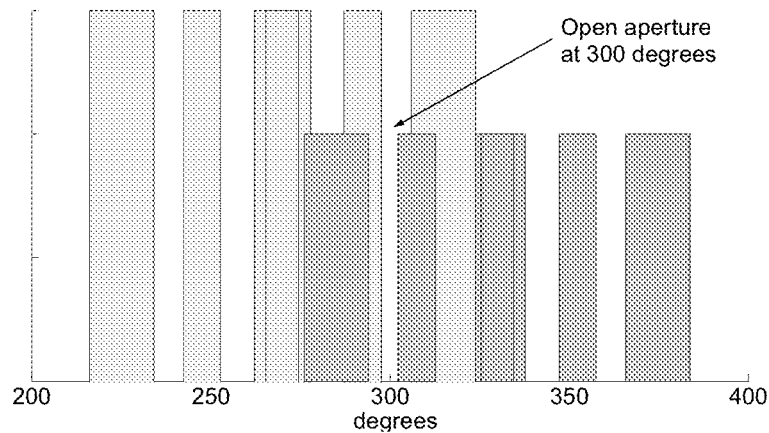
FIG. 5A is a graph in which tall bars are all shadows on an outer core as it rotates through the right side of the fiber in FIG. 2. The short bars are the adjacent outer core, behind by 60°. At 270° the "tall" core aligns with the center core. At 330° the "short" core aligns with the center core. At 300° they are in the orientation shown in FIG. 2. This is the position for the open aperture for these cores, and hence all cores to be irradiated by side scattered light.
Figure 5B:
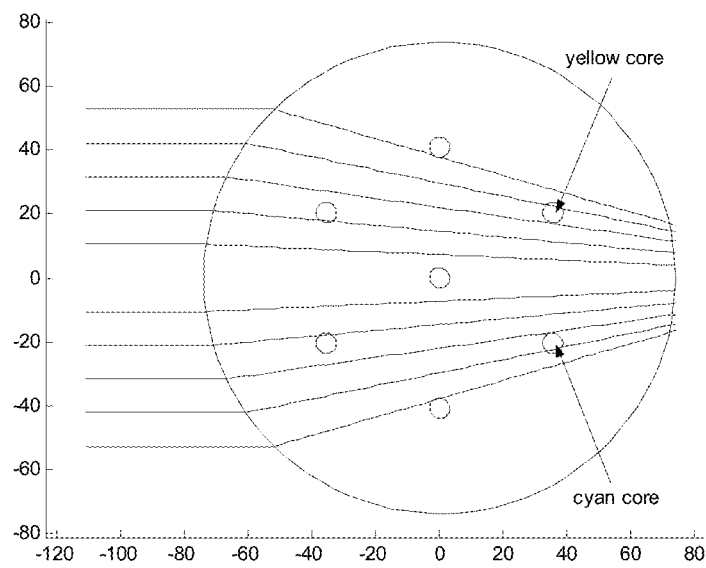
FIG. 5B is a graph with rays showing the open aperture position at 300°. These rays show that each core is irradiated without shadowing in this orientation. "Yellow" corresponds to the "tall" outer core, "cyan" corresponds to the "short" adjacent outer core.

Referencing FIGS. 5A-B the taller bars are all shadows on an outer core as it rotates through the right side of the fiber in FIG. 2. The shorter bars are the adjacent outer core, behind by 60°. At 270° the "taller" core aligns with the center core. At 330° the "shorter" core aligns with the center core. At 300° they are in the orientation shown in FIG. 2. This is the position for the open aperture for these cores, and hence all cores to be irradiated by side scattered light. (b) Rays showing the open aperture position at 300°. These rays show that each core is irradiated without shadowing in this orientation.

In reality, the write beam enters the fiber at an angle γ. On this case the incoming beam has components in both the x and z directions:

$$\bar{k}_s = k_{xs}\hat{x} + k_{zs}\hat{z} = k_s\cos\gamma\hat{x} + k_s\sin\gamma\hat{z}$$

Where $$k_s = \frac{2\pi n_z}{\lambda}$$

Snell's law requires that the component of k parallel to the surface must be continuous across the surface. Therefore, to apply Snell's law it is necessary to compute the component of the incident k vector parallel to the surface. We use cylindrical coordinates for this transformation:

$$\bar{k}_s = k_{xs}\hat{x} + k_{zs}\hat{z} = -k_s[\cos\gamma\cos\alpha\hat{r} + \cos\gamma\sin\alpha\hat{\theta} - \sin\gamma\hat{z}]$$

Snell's law at the interface requires that the z and θ components of k be continuous across the boundary. The r-component is then computed from the constitutive relation for the propagation constant in the medium:

$$\bar{k}_f = k_{fr}\hat{r} - k_s\{\cos\gamma\sin\alpha\,\hat{\theta} - \sin\gamma\,\hat{z}\}$$

-continued $$k_f = \frac{2\pi n_f}{\lambda}$$

$$k_{rf} = -\sqrt{k_f^2 - k_s^2\cos^2\gamma\sin^2\alpha - k_s^2\sin^2\gamma}$$

We choose the negative root since we know that the ray goes in the +x direction. To find the slope we then have to convert back to x and y coordinates:

$$\hat{r} = -\cos\alpha\hat{x} + \sin\alpha\hat{y}$$

$$\hat{\theta} = -\sin\alpha\hat{x} - \cos\alpha\hat{y}$$

This is more clearly expressed in matrix form:

$$\begin{bmatrix} k_{xf} \\ k_{yf} \\ k_{zf} \end{bmatrix} = \begin{bmatrix} -\cos\alpha & -\sin\alpha & 0 \\ \sin\alpha & -\cos\alpha & 0 \\ 0 & 0 & 1 \end{bmatrix} \begin{bmatrix} k_{rf} \\ k_{\theta f} \\ k_{zf} \end{bmatrix} =$$

$$\begin{bmatrix} -\cos\alpha & -\sin\alpha & 0 \\ \sin\alpha & -\cos\alpha & 0 \\ 0 & 0 & 1 \end{bmatrix} \begin{bmatrix} -\sqrt{k_f^2 - k_s^2\cos^2\gamma\sin^2\alpha - k_s^2\sin^2\gamma} \\ -k_s\cos\gamma\sin\alpha \\ k_{zf}\sin\gamma \end{bmatrix}$$

From this expression one can compute the slope m as before:

$$m(\alpha, \gamma, n_z, n_f) = \frac{k_{yf}}{k_{xf}}$$

This can be expressed without matrix multiplication as:

$$m = \frac{-\sin\alpha\sqrt{n_f^2 - n_z^2\cos^2\gamma\sin^2\alpha - n_z^2\sin^2\gamma} + n_s\cos\gamma\cos\alpha\sin\alpha}{\cos\alpha\sqrt{n_f^2 - n_z^2\cos^2\gamma\sin^2\alpha - n_z^2\sin^2\gamma} + n_s\cos\gamma\sin^2\alpha}$$

One can also compute the z slope:

$$m_s(\alpha, \gamma, n_s, n_f) = \frac{k_{sf}}{k_{xf}}$$

Here the dependence on material and incident parameters are explicitly included.

The equations for the ray are then $$y(x) = mx + y_o$$

$$z(x) = m_z x + z_o$$

The entry point is now:

$$x_r = -R_f\cos\alpha$$

$$y_r = -R_f\sin\alpha$$

$$z_r = 0$$

The intercepts are computed from $$y_r = mx_r + y_o$$

$$0 = m_z x_r + z_o$$

The points of intersection with a cylinder are given from:

$$y = mx + y_o$$

$$z = m_z x + z_o$$

$$(y - y_c)^2 + (x - x_c)^2 = r^2$$

From these equations is it clear that the z-slope does not affect the intersection point. Therefore, from this point, the solution for the point of tangency is the same:

$$(mx_{c1} + y_o - y_{c1})^2 - (m^2 + 1)r^2 = 0$$

$$(mx_{c2} + y_o - y_{c2})^2 - (m^2 + 1)r^2 = 0 \quad (11)$$

Figure 6A:
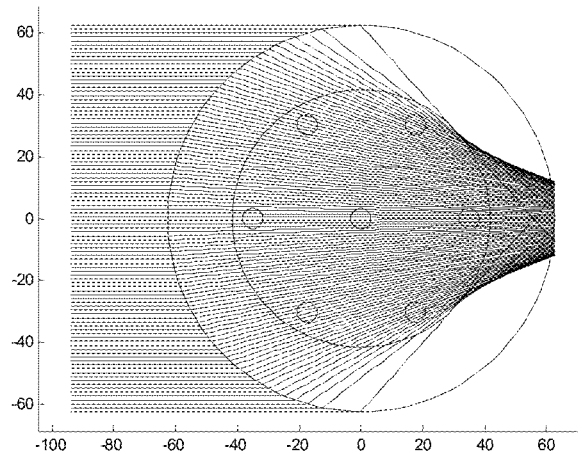
FIGS. 6A-B depict rays entering fiber with normal incidence (FIG. 6A) and with oblique angle of asin(0.248/1.07) (FIG. 6B) which is what is used in 1550 nm gratings. Very little change is evidenced. Inner boundary circle is the same in both FIGS. 6A and B.
Figure 6B:
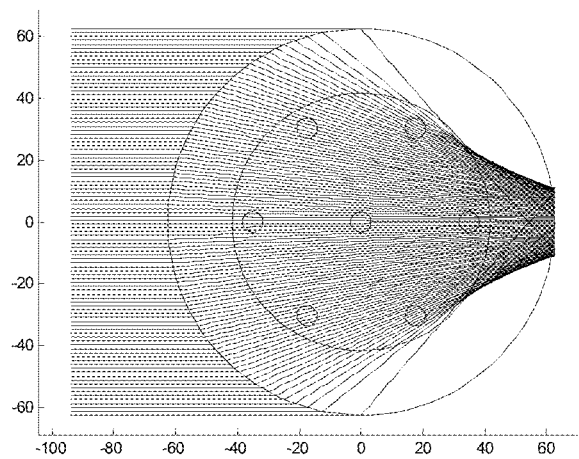

In FIG. 6 we show the rays for the case oblique incidence when writing 1550 nm Bragg gratings. The rays are very similar. Thus, the approximation of normal incidence is fairly accurate.

We now consider an example fiber design aimed at placing seven hexagonally arrayed cores with no shadowing of radiation from a given direction.

Given that the symmetric position discussed above in FIG. 2 is the critical position for shadowing, that is where it first occurs as we change the core size, and we can derive a design plot for optical fibers that will have no shadowing in this position. The critical value where there is no open aperture (i.e., no shadowing) is Ro/2 (not derived here, but clear from analysis of symmetric position). With this value is it possible to obtain the boundary for values of $R_c$ for any $R_o$ and $R_f$. This is plotted in FIG. 7A for a fiber radius of 146/2 microns.

The fiber must have core radius normalized to fiber radius below the solid line, and it must have a core offset normalized to radius such that the dotted line is larger than 0. This condition just states that the core offset and radius must be less than the fiber radius.

While these conditions are aimed at preventing shadowing, it is also possible to impose constraints on the design that prevent a given core from being partially in the non-irradiated region in the upper and lower right hand parts of the fiber ray image shown in FIG. 2. For instance, irradiation of the top and bottom cores can put a constraint on the fiber design. From the discussion above the light will not be present after a radius of $$R_{max} = \frac{n_s R_f}{nf}.$$

Spatially the boundary of no light due to lensing may be approximated by the top ray of FIG. 2, which slants down in the fiber at an angle of $\sin(\theta_r) = n_s/n_f$. Inspection of the limits of $R_o$ and $R_c$ for the top core yield the following expression for their maximum values:

$$(n_s/n_f)(R_f - R_o) - R_c > 0.$$

Figure 7A:
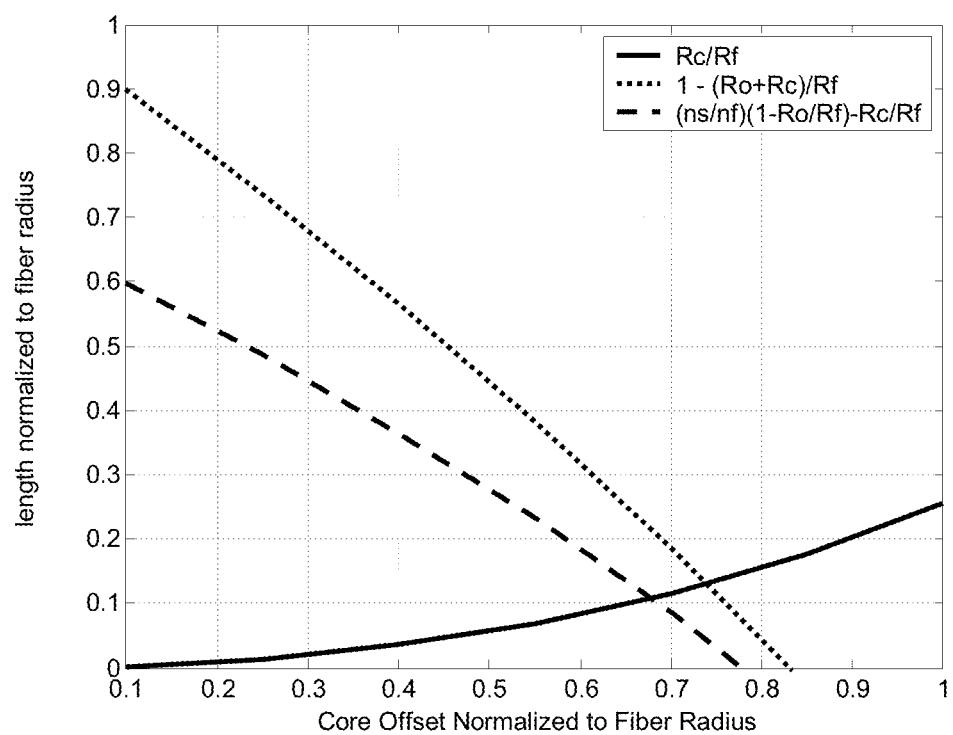
FIG. 7A depicts fiber design space in accordance with the invention for fibers with hexagonal array in which all cores can be irradiated with an incoming plane wave beam. Valid fibers are below the solid line and have both dotted and dashed lines greater than zero.

This case is also plotted in FIG. 7A. Thus the fiber must have the dashed line positive as well.

While not computed here, other constraints may also be added to the design problem. For instance, the condition that the right core in FIG. 7b not enter the unirradiated regions of FIG. 2 may also be added. Note, though, that such constraints are added above and beyond the constraint of no shadowing of one core by another.

Figure 7B:
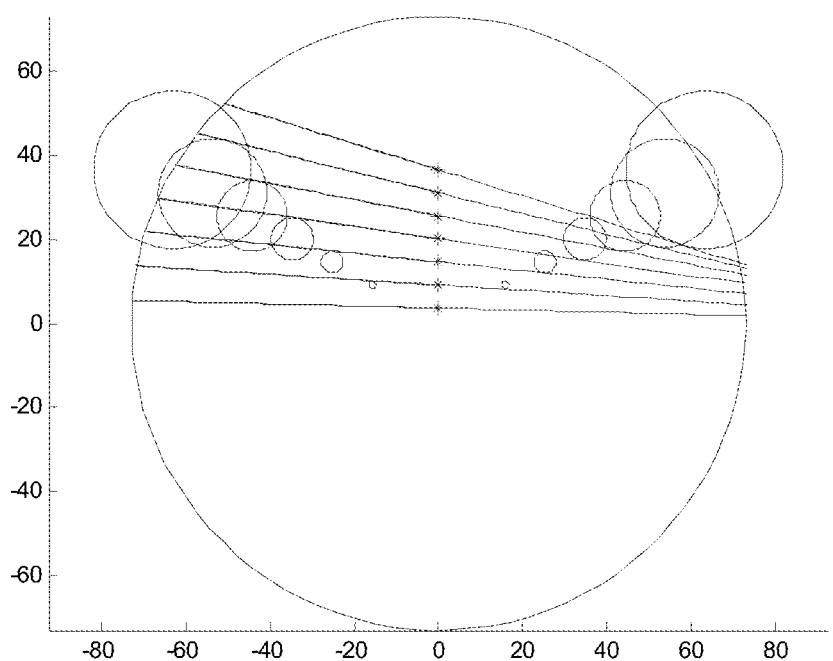
FIG. 7B depicts core placement and size defining the maximum value for these parameters that allows for an open aperture for an incoming beam.

The corresponding rays are show in FIG. 7B. Note that in this case the core radius of 146/2 is evident. The largest core offsets $R_o$ yields impossible cores that do not fit inside the fiber radius. These are excluded by the constraint of having the dotted line positive in FIG. 7(a).

Figure 8A:
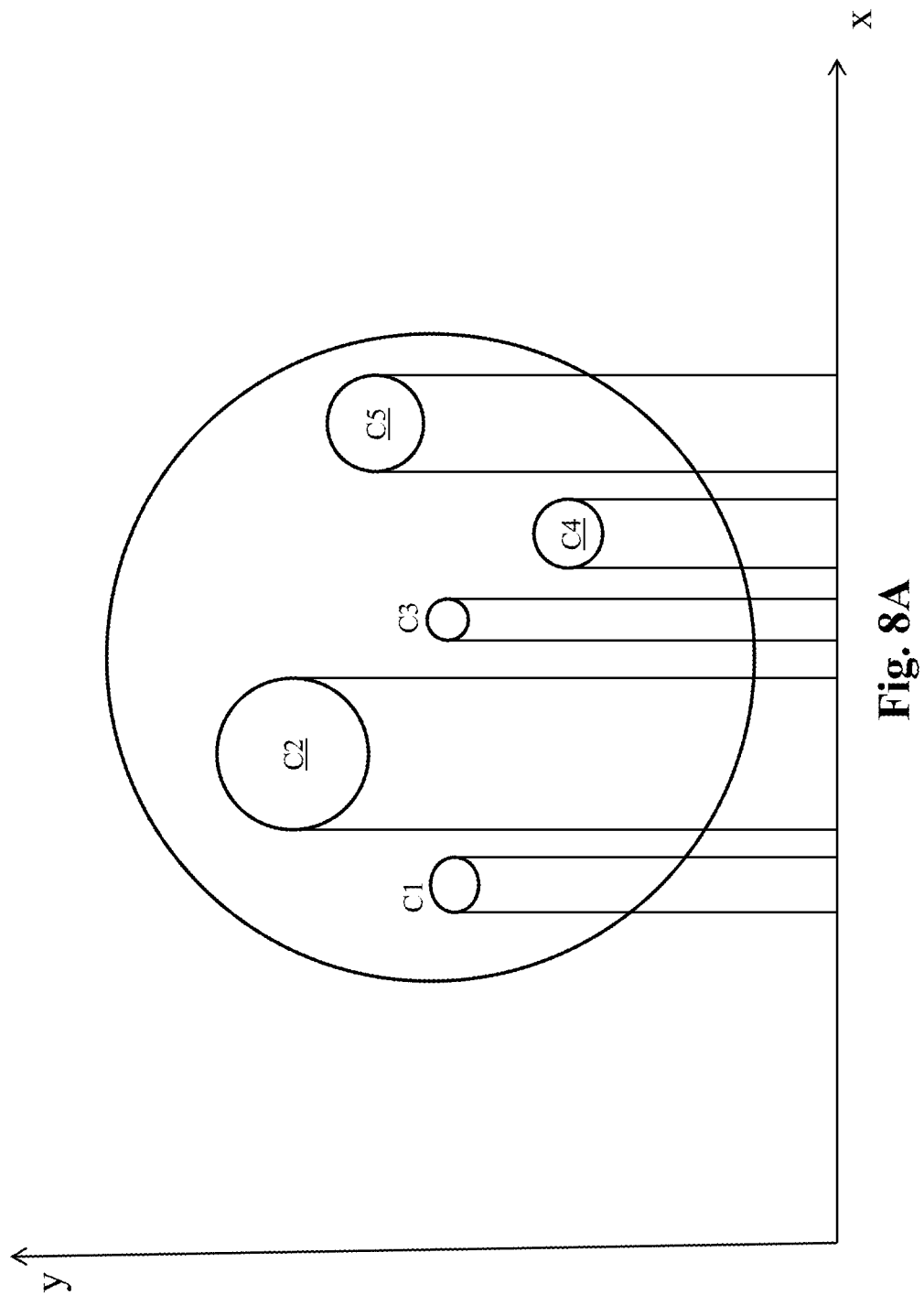
FIG. 8A is a schematic of a 5-core fiber having cores of varying sizes and asymmetrical placement within the fiber.
Figure 8B:
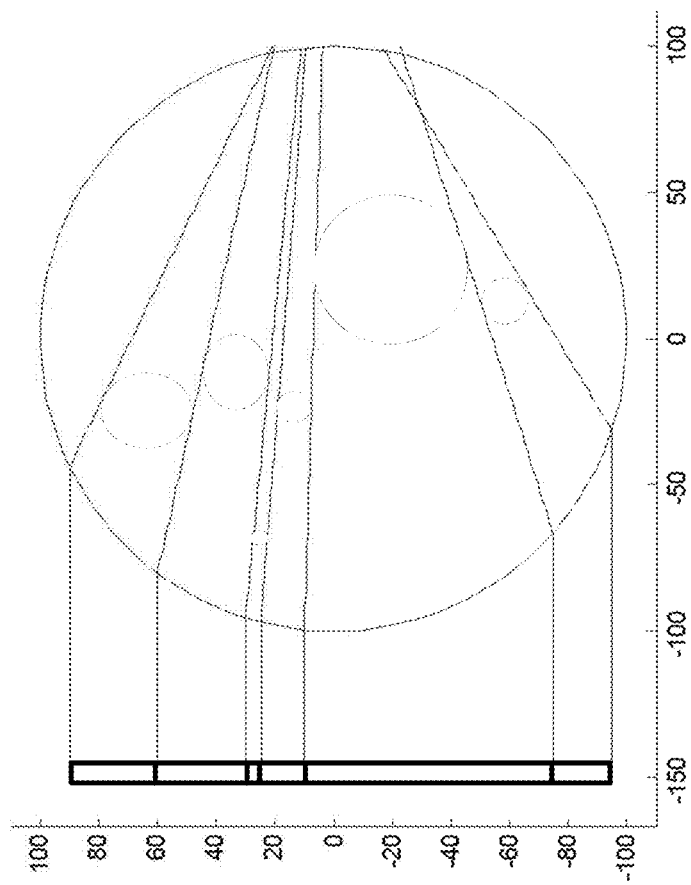
FIG. 8B is a schematic of a no-shadow core arrangement when lensing at the surface is included.

The above description in connection with FIGS. 1-7 is for highly symmetric core designs. However, symmetry is not required, either in core placement, core size, or any parameter. For example, FIG. 8A is a schematic of a hypothetical asymmetrical fiber having five cores C1-C5. No two cores C1-C5 have the same width or diameter, nor do they have any regular polygonal or lattice-type arrangement within the fiber. One of ordinary skill would recognize, however, that the cores need not be circular. Nevertheless, the same design criteria are taken into consideration: core width/diameter, core position (in X, Y coordinates, for example), and overall angle of orientation of the fiber. Thus, for a five-core fiber, there are 16 parameters to consider: five core widths/diameters, five core X coordinates, five core Y coordinates, and one overall angular orientation. FIG. 8A illustrates a fiber in which no shadowing of one core by another occurs. That is, tangents of core widths are projected or traced against an orthogonal x-axis to ensure that there is no overlap of resulting core projections on the axis. FIG. 8B illustrates a fiber having a no-shadow core arrangement in which lensing at the surface is included. A practical application of the above inventive method is the parallel fabrication of fiber DFB lasers in all seven cores of a hexagonally arrayed seven core fiber. The lasers were found to be dual polarization and single longitudinal mode. We also report linewidth measurements using a delayed self-homodyne interferometer. All lasers linewidths are less than 300 kHz.

Figure 9A:
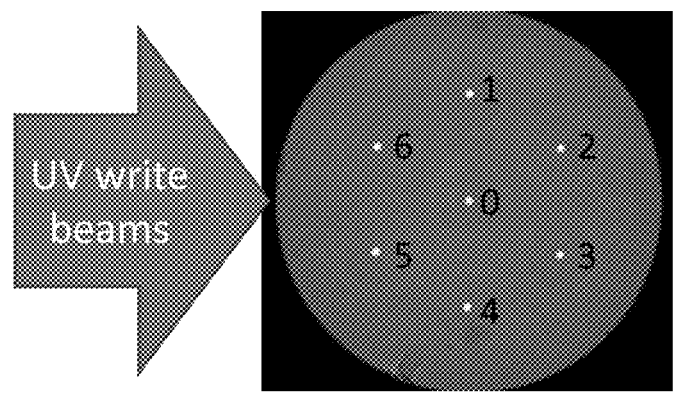
FIG. 9A is an image of a multicore fiber showing core numbers and direction of UV writing beams in accordance with the invention.

FIG. 9A shows a cross-section of our multicore EDF (MC-EDF). The fiber is from the same preform and draw as that used in prior fibers. The cores of the MCF are similar to existing cores OFS MP980 manufactured by OFS Optics and have diameter 3.2 µm, numerical aperture 0.23 and attenuation coefficient of ~6 dB/m at 1530 nm. The cores are arranged in a hexagonal array with a 40 µm pitch. The fiber outer diameter is 146 µm. The large core spacing resulted in very low coupling and cross talk between the cores, making them independent of each other.

Figure 10A:
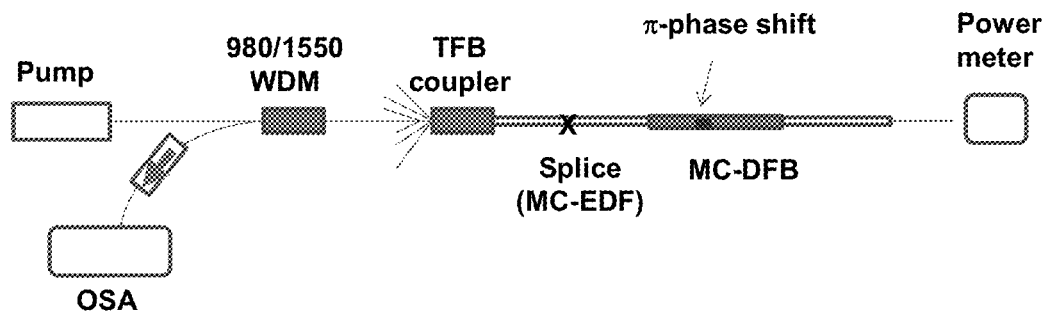
FIG. 10A is a schematic of an experimental setup used to measure the multicore fiber DFB in accordance with the invention.

Fiber gratings were inscribed in all cores at once using a UV interferometer point by point writing system operating at 244 nm. The grating refractive index modulation had a uniform profile and length 8 cm. A discrete phase shift was placed at 0.64 cm offset from the physical center of the grating to produce efficient unidirectional lasing. The offset phase shift is indicated in FIG. 10A. Gratings were thermally annealed after inscription.

Figure 9B:
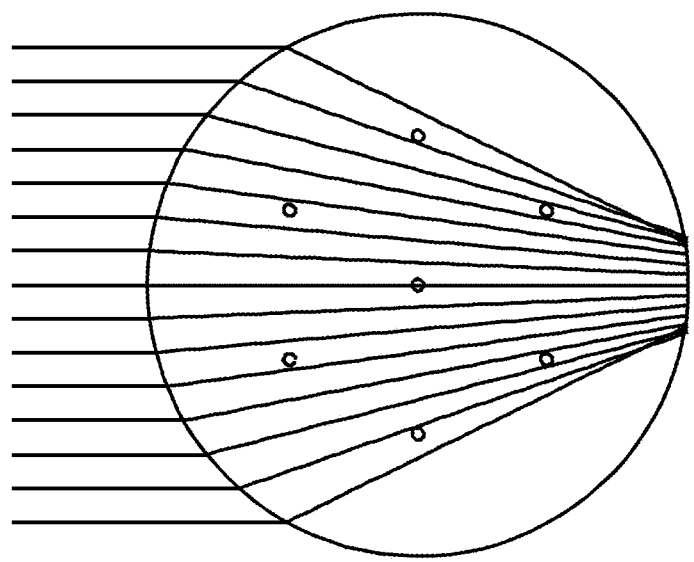
FIG. 9B is a schematic showing ray tracing of UV writing beam showing unobstructed irradiation of all cores in accordance with the invention.
Figure 9C:
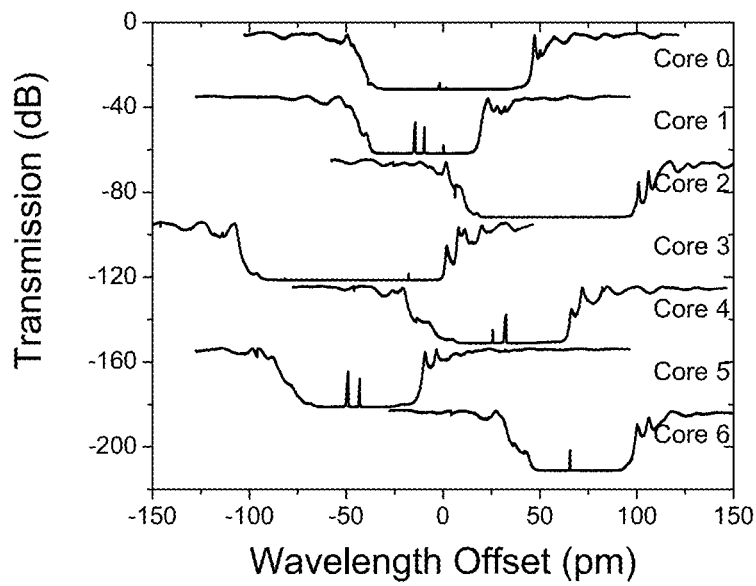
FIG. 9C is a graph showing transmission spectrum of DFB cavity inscribed in each core measured with a scanned laser. Zero wavelength offset corresponds to 1545.762 nm. Plots offset by 30 dB for clarity.

UV dosage at each core is expected to vary as a result of both fiber lensing and core shadowing. In order to ensure uniform irradiation of all the cores using one exposure, several steps were taken. Firstly, the transverse dimension of the writing beam was adjusted to 370 µm, large compared to the fiber diameter. Secondly, fiber twist, as measured from a transverse image of the fiber cores, was removed before exposure. Thirdly, the fiber was oriented with respect to the writing beam as shown in FIG. 9A. Ray tracing for a plane wave approximating one of the writing beams is shown in FIG. 9B. Note that although core 6 appears to block the path of light to core 2, in fact when the lensing at the fiber surface is taken into account, core 2 is irradiated without any obstruction from 6 or 1. FIG. 9C shows the transmission spectrum for each core measured using a tunable external cavity semiconductor laser with a scanning resolution of 0.2 pm. These spectra show that core 2 and 3 had the largest spectral widths. This is expected from the lensing effect of the front surface of the fiber as is evident in FIG. 9B. Cores 0, 1, 4, and 5 show two DFB cavity resonances. As discussed below, these may be attributed to polarization splitting of the DFB cavity resonance. The dynamic range of our scanned laser spectra was not sufficient to see the DFB resonances in the cores 2 and 3.

FIG. 10A shows the setup used to characterize the seven core DFB laser output. The DFB gratings were spliced to a 1×7 tapered fiber bundle (TFB) fanout coupler. The fanout coupler was fabricated by tapering (taper ratio: ~3) a bundle of 7 specially designed fibers. The tapered end of the fiber-bundle had 7 cores with mode field diameter of 6 μm, and core-to-core pitch of 40 μm, and was directly spliced to a length of MC-EDF. This was then spliced to the MC-EDF fiber section containing the DFB. The length of the MC-EDF between TFB and the DFB was ~1.2 m. The phase shift was oriented to establish lasing in the backward direction through the fanout. A WDM was used to split the pump and signal. In our measurements each DFB was measured separately by splicing the pump to the corresponding fanout pigtail. The pump power was varied from 0 to 257 mW for each laser. Pump absorption as measured from the center core was ~15%. Signal power was recorded after the WDM. The MCF was held straight during measurement.

In order to compare the performance of each laser, an estimate of the relative losses between cores was required. Pump reaching the DFB varied for each core due to differential losses in the TFB fanout coupler and the MC-EDF splice. To obtain an estimate of the pump power at the DFB, we recorded the residual pump exiting the MC-EDF after the DFBs. This fiber was short (<20 cm) and had no splice, so power exiting the fiber gave a good estimate of the actual pump at each DFB as well as the relative losses in the TFB and MC-EDF splice. The relative loss (compared to the center core 0) was up to 3.2 dB for core 5. These same losses affected the DFB signal propagating to the WDM from each laser as well. We used the estimated relative losses for the pump to correct each signal power. We also computed the gain for the signals in the MC-EDF and found that it was roughly 5 dB, largely independent of both pump and signal power for the ranges in our measurements. Therefore, we did not correct for relative gains. In correcting for signal losses, we took the center core as unchanged.

Figure 10B:
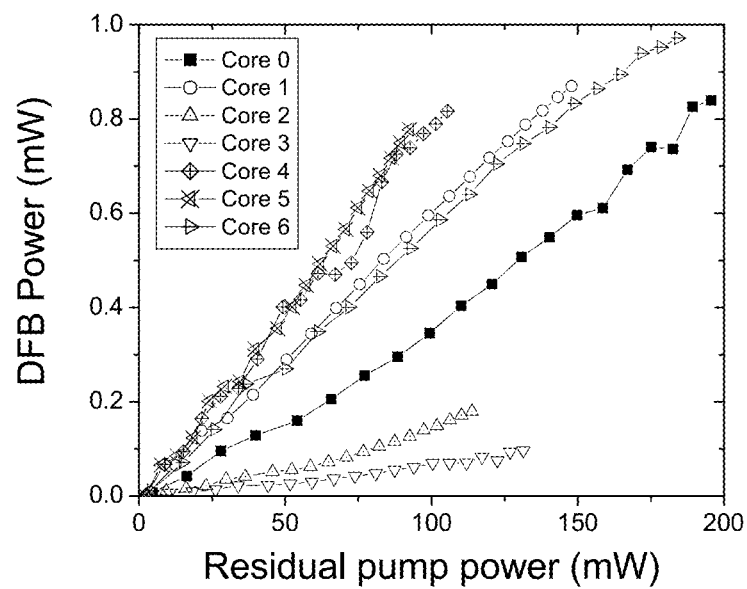
FIG. 10B is a graph of Signal power after WDM vs residual pump power measured after DFB cavity.
Figure 10C:
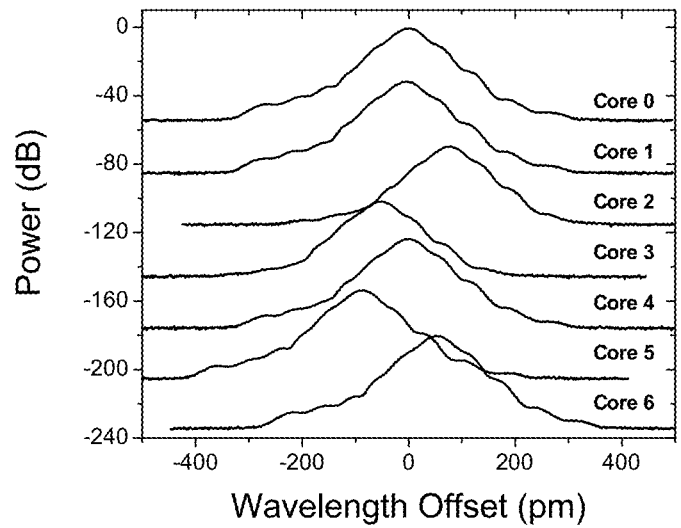
FIG. 10C is a graph of optical spectrum measured for each core. Plots offset for clarity. Zero wavelength offset corresponds to 1545.434 nm.

FIG. 10B shows the corrected DFB output power measured vs residual pump measured after the grating. Threshold was observed for residual pump power of 4-8 mW for all cores. Slope efficiencies varied by 11 dB between lasers, a substantial improvement over the prior DFBs mentioned above where one core lased with 100× less power than the others. Variation in slope efficiency may be attributed to varying in the grating properties, likely the result of varying UV exposure conditions within the fiber and nonuniformities of the writing beam. Note that the transmission spectra of the two weakest lasers (cores 2 and 3) had the largest UV dosage and the greatest bandwidth. These cores may have been overexposed or they may have defects that made their phase shifts deviate from the desired value of π. FIG. 10C shows the DFB spectrum from each core (resolution 0.06 nm). These spectra show that the cores all lased within a range of 0.2 nm. The location of each lasing peak is similar to the location of the defects in transmission spectra of FIG. 9C. Variations in lasing wavelength are attributed to differences in the effective indices of the cores.

Figure 11:
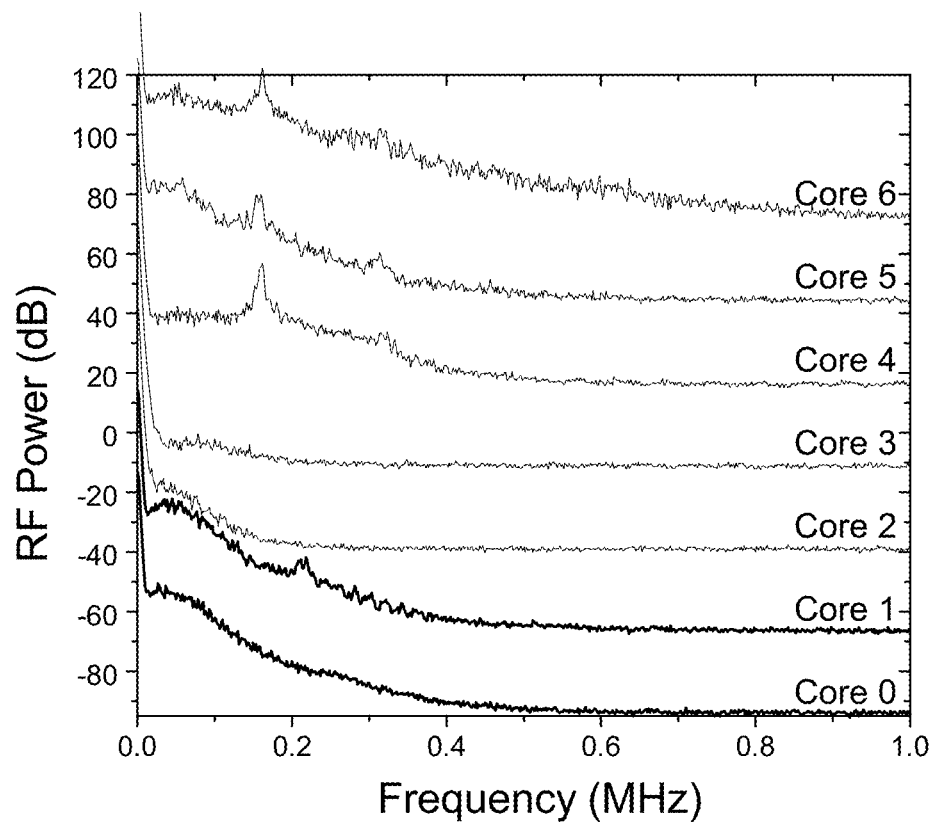
FIG. 11 is a graph showing RF spectra measured for each core after delayed self-homodyne interferometer. Curves offset for clarity.

In a separate experiment, we obtained an estimate of the linewidth of each laser using a delayed self-homodyne interferometer. Our interferometer had a delay line 21.5 km long. Each measurement was performed with the DFB at maximum output power. The RF spectra exiting the interferometer are shown in FIG. 11. These spectra are averages over 100 measurements. Single measurements showed more noise and were variable, however the linewidth was still less than 1 MHz even for a single spectrum. RF measurements up to 1 GHz were also performed and beat notes were observed in all lasers in the range from 400-800 MHz. This frequency range is similar to the splitting of the two resonances observed in FIG. 1(*c*). It is known that polarization beat notes can occur in the 0.1-1 GHz frequency range in fiber DFB lasers, and we attribute this beat note to polarization splitting of the DFB cavity resonance.

We have demonstrated parallel fabrication of functioning fiber Bragg grating DFB lasers in all of the cores of a seven core Er doped fiber using a single exposure to a UV interferogram. We verified sub-MHz linewidth lasing in all seven cores. We expect that precision fabricated multicore fiber gratings and lasers will help fulfill the promise of multicore fiber technology in various application areas including sensing, telecom and high power lasers.

Another application for the inventive method is multicore pump couplers, useful for devices such as multicore optical amplifiers. One type of such a coupler employs gratings to couple externally incident free space pump beam to the multiple cores. For such a device to be efficient, it is desirable for the incoming pump to interact with each core equally, without any shadowing from other cores. That is, each core should be addressed independently with a free space beam from a give direction or directions without interference from the other cores or any other microstructure in the fiber.

Figure 12:
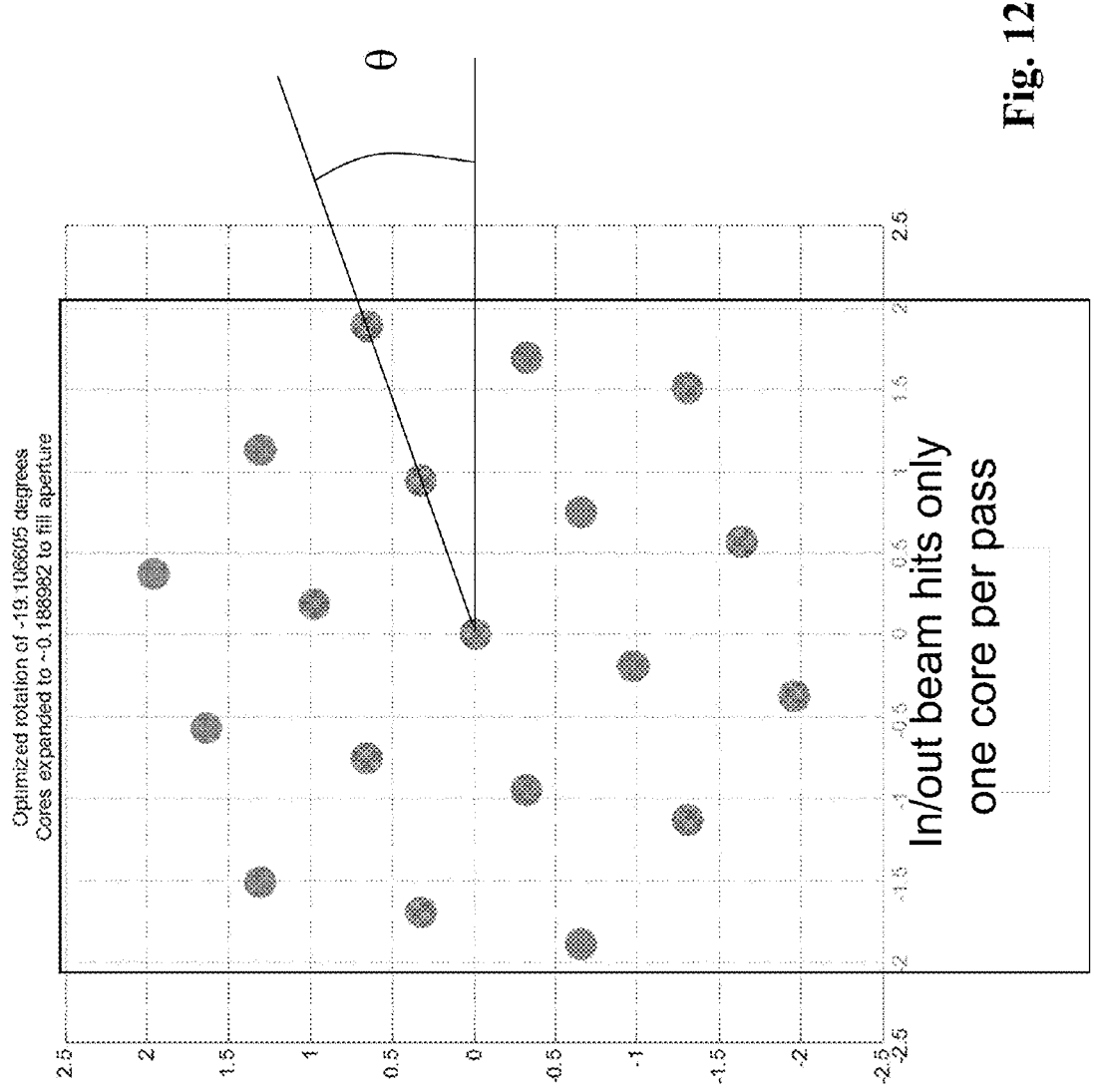
FIGS. 12 and 13 are schematics depicting fiber designs in accordance with the invention, having 19 and seven cores, respectively, arranged in a hexagonal lattice that achieve independent coupling to each core. At the top of each figure is the orientation of the fiber and the maximum diameter of the core with respect to the core lattice spacing for no shadowing.
Figure 13:
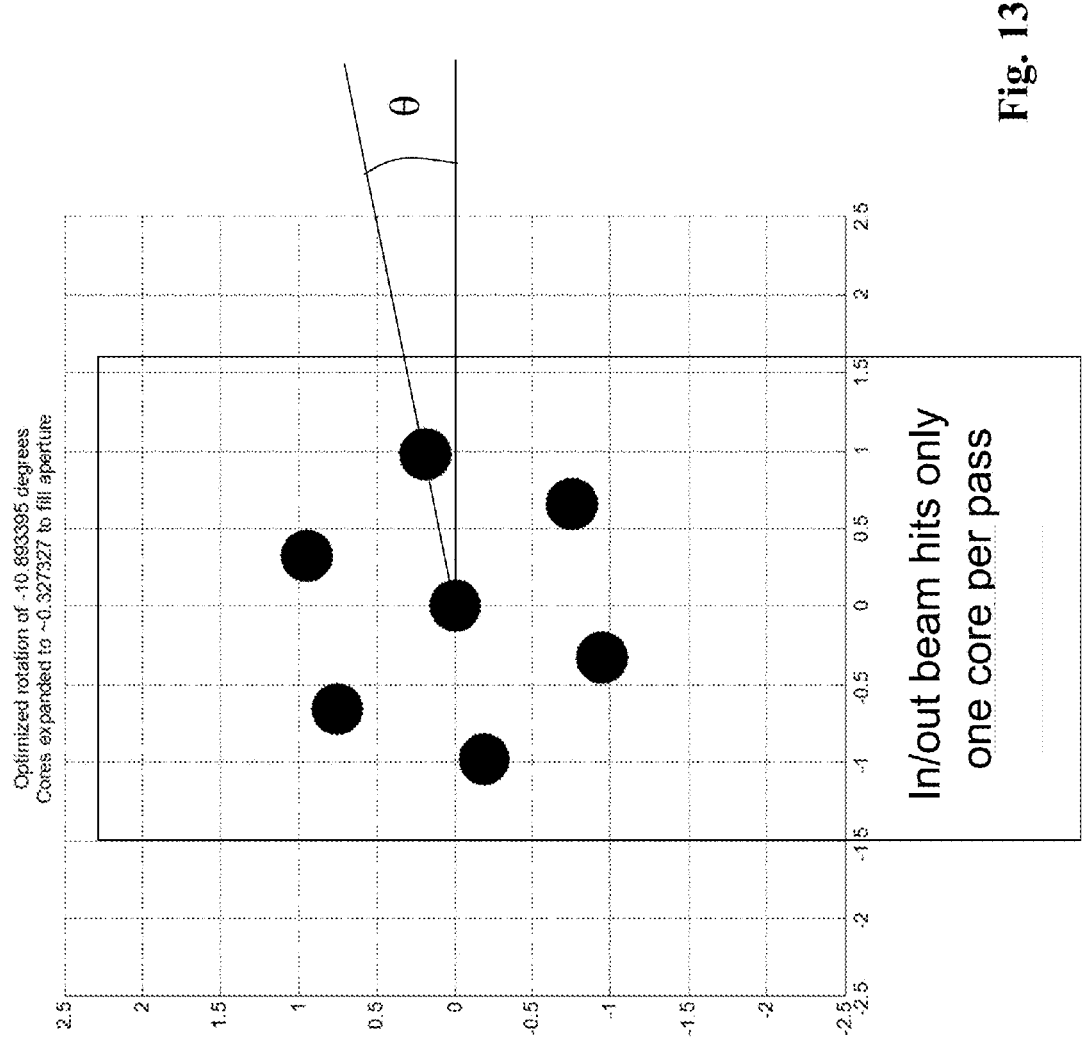

FIGS. 12 and 13 show fiber designs with 19 and 7 cores, respectively, arranged in a hexagonal lattice, that achieve such independent coupling to each core. The orientation of the fiber and the maximum diameter of the core with respect to the core lattice spacing appears at the top of each figure. For the orientation given, any core diameter less than that shown in the figure will result in the input beam independently addressing all of the cores without shadowing.

We note that the gratings may be inscribed by writing beams (for example a UV interference pattern) that enter the fiber through the same orientation, thereby inscribing gratings in all cores without shadowing from any other core. Further, an additional design step allows for a separate unshadowed pathway for the inscription to come from one direction and the pump beam to come from another direction.

Figure 14:
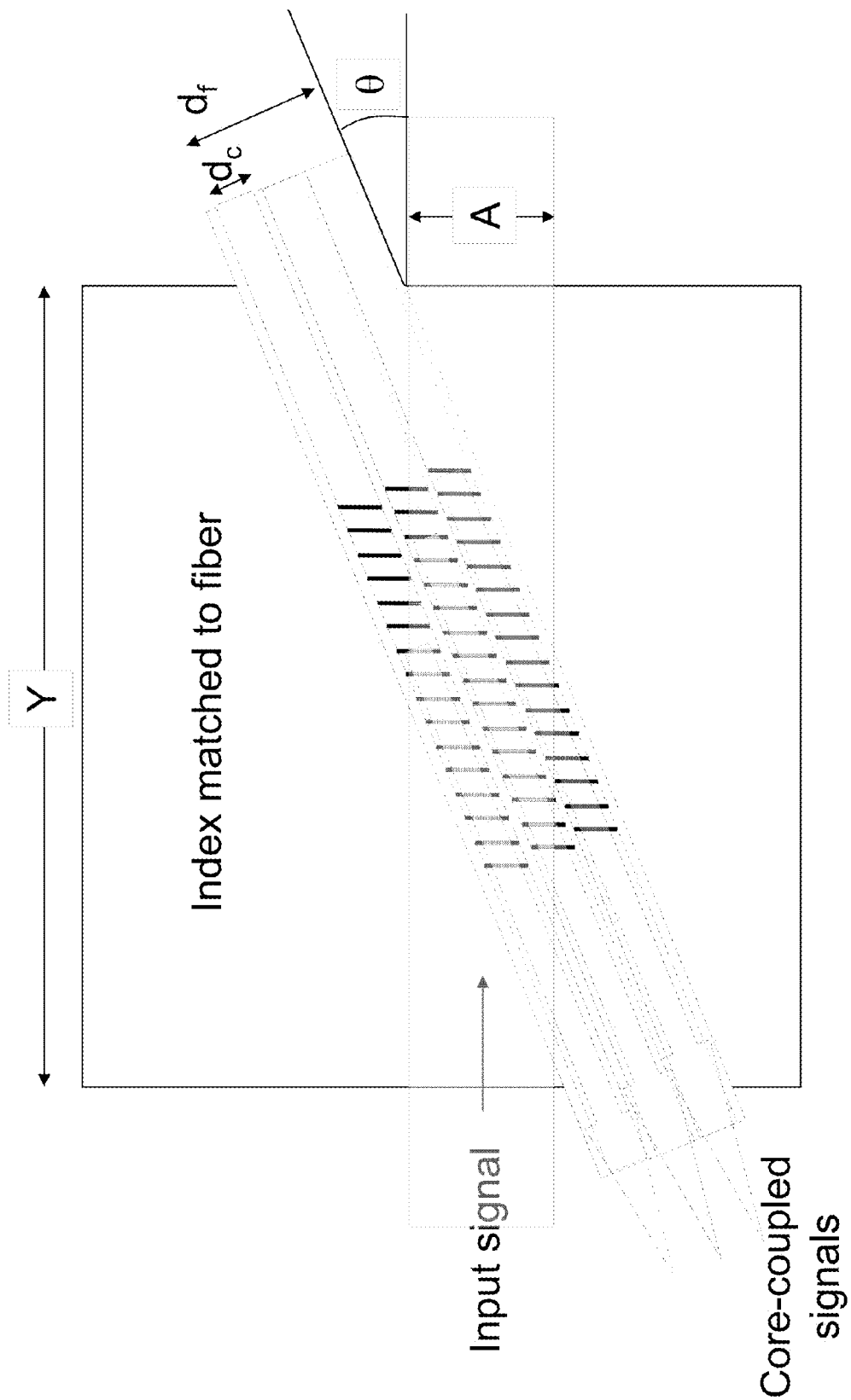
FIG. 14 is a schematic of a multicore pump coupler in accordance with the invention.

FIG. 14 shows one such pump coupler. The horizontally propagating pump beam enters the fiber at an angle theta through an index matched coupling block. All cores are addressed without shadowing by other cores.

Figure 15:
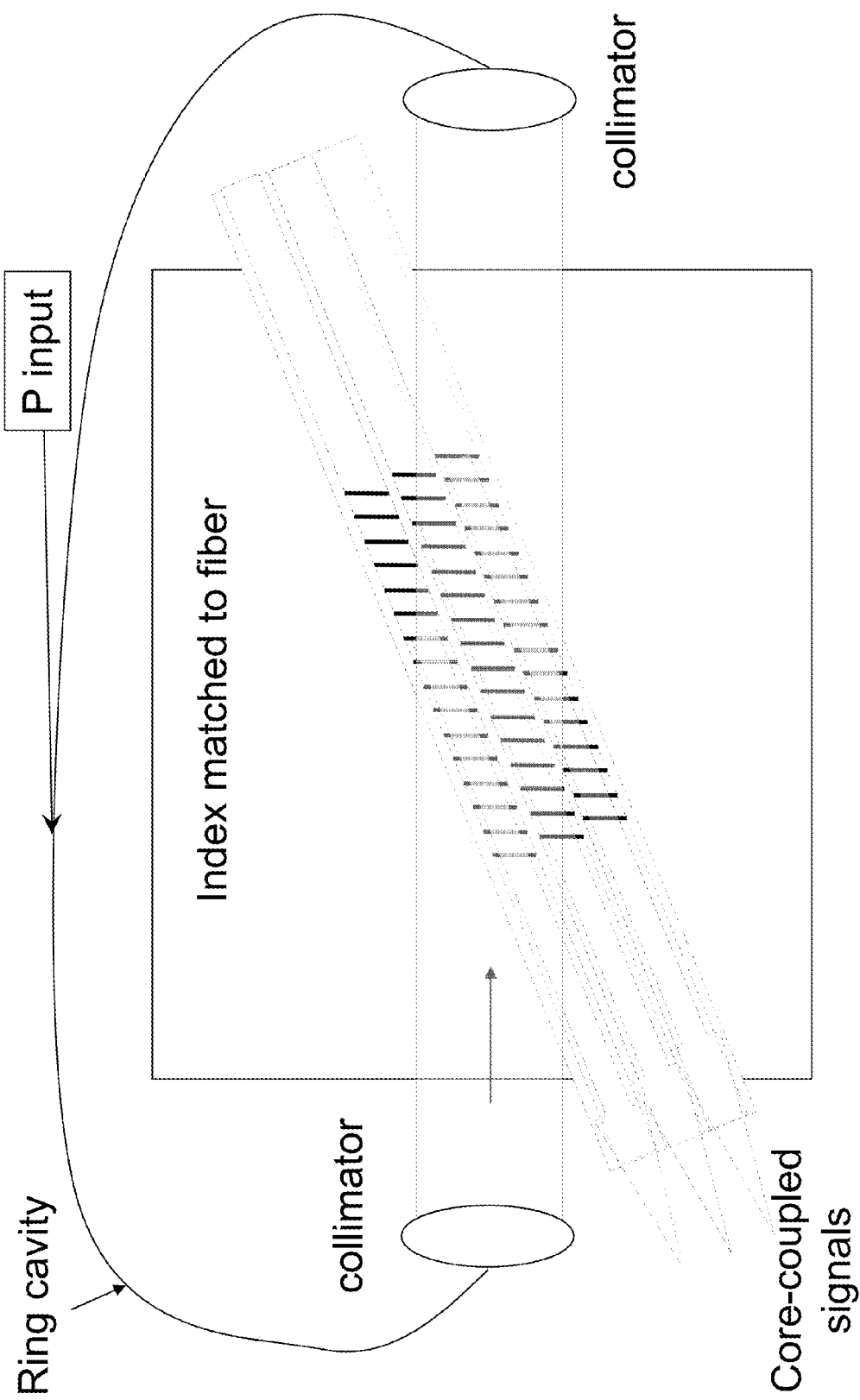
FIG. 15 is a schematic of a multicore pump coupler in accordance with the invention in a ring cavity.
Figure 16:
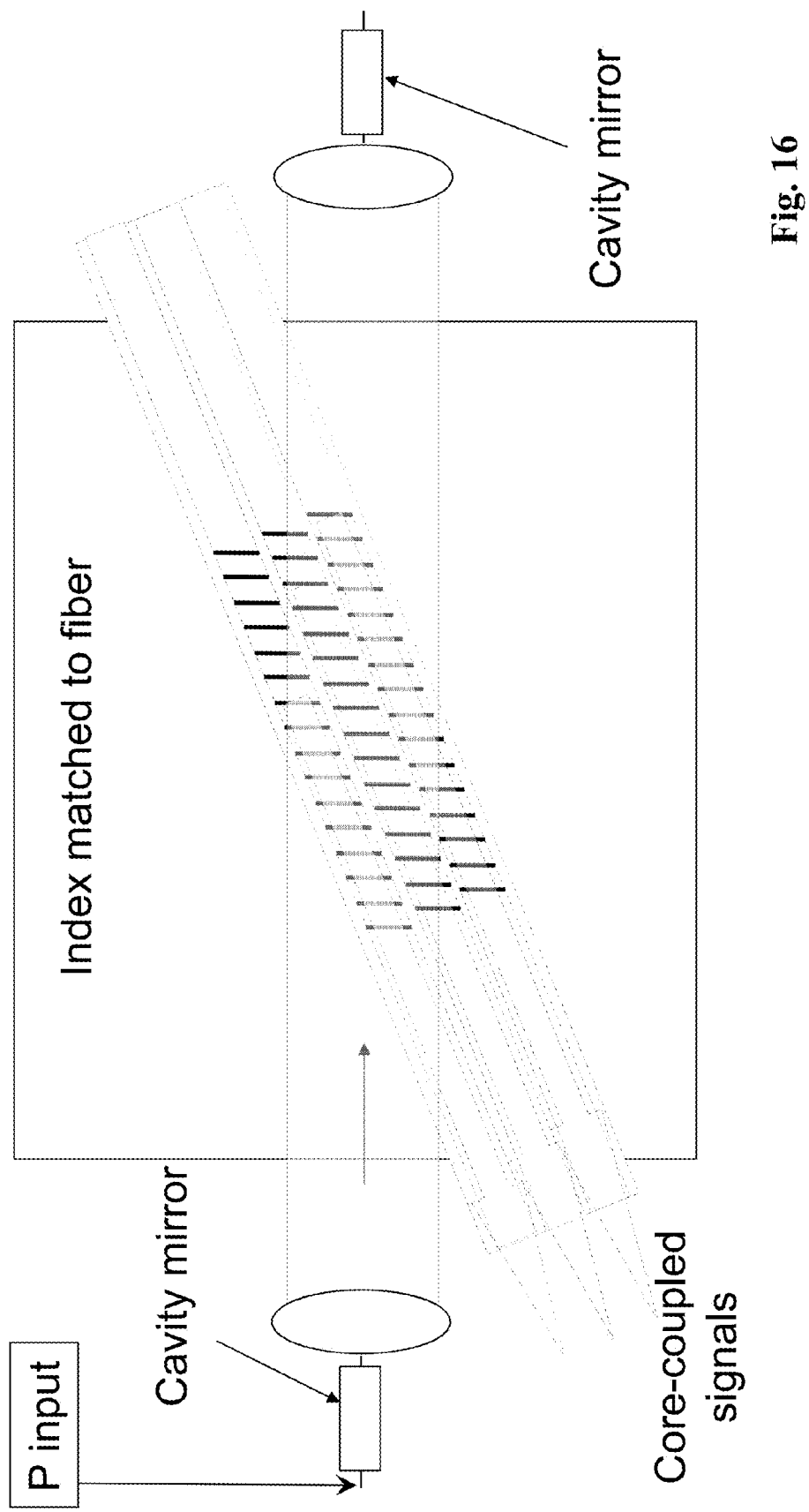
FIG. 16 is a schematic of a multicore pump coupler in accordance with the invention in a fabry perot cavity.

FIGS. 15 and 16 depict pump coupling arrangements. FIG. 15 shows the grating coupler in a ring cavity. FIG. 16 shows the grating coupler in a fabry perot cavity. The following exemplary equations may be used to estimate how strong the grating should be to couple light into the cores:

$A = (Y \sin \theta - d_f)/\cos \theta \sim Y\theta$ $A \sim 2w(Y/2) = 2w_0(1 + (\lambda Y/4\pi w_0^2)^2)^{1/2}$ Grating coupling $\sim (\kappa L_{eff})^2$ $\kappa = \pi \Delta n \eta / \lambda$ $L_{eff} = d_c / \sin \theta$ Grating coupling $\sim \pi \Delta n \eta d_c / \lambda \sin \theta$ $V \sim d*NA$ $L_{eff} \sim d/NA \sim d^2/V \sim V/NA^2$ The invention is not limited to the above description. For example, all of exemplary cores shown and described above are circular in cross section, however any other geometry may be employed within the given design space. For example, optimizing core width for a circular core includes optimizing the core diameter. However, if the core is not circular (e.g., it is elliptical), then width represents the dimension as seen by the incoming/outgoing radiation. Usually, this dimension would be the shortest dimension of the core.

Also, although the term "core" is used throughout the specification as an element to be optimized, non-guiding regions, such as stress rods and air regions, are also encompassed within the scope of the invention. The term "core" typically implies a high index of refraction material, so it can guide light. However in the context of this specification, "core" includes both low and high index regions. Such non-guiding regions may not have to be irradiated. They may therefore sit in a shadow, but they cannot form a shadow (except perhaps onto other non-guiding regions). Other variations are also contemplated.

Having described certain embodiments of the invention, it should be understood that the invention is not limited to the above description or the attached exemplary drawings. Rather, the scope of the invention is defined by the claims appearing herein below and includes any equivalents thereof as would be appreciated by one of ordinary skill in the art.

What is claimed is:

1. A method of designing multicore optical fibers, comprising the steps of:
   a) selecting a geometry for the core arrangement;
   b) optimizing at least one of i) core width, ii) core position with respect to other cores, or iii) orientation with respect to incoming radiation,
   wherein steps a) and b) are performed to generate at least one core design in which no core shadows or blocks any other core with respect to external lateral incoming, outgoing, or at least partially traversing radiation, wherein said lateral incoming, outgoing, or at least partially traversing radiation comprises at least one of i) an inscription beam or ii) an addressing beam.

2. A method of designing multicore optical fibers according to claim 1, wherein said optimizing step further comprises the steps of i) tracing tangents of core widths against an orthogonal axis and ii) ensuring no overlap of space between said tangents on said axis.

3. A method of designing multicore optical fibers according to claim 2, wherein said step a) further comprises the step of selecting a hexagonal array of cores.

4. A method of designing multicore optical fibers according to claim 3, wherein said step a) further comprises the step of selecting an array of cores comprising seven cores.

5. A method of designing multicore optical fibers according to claim 1, said selecting step further comprises the steps of selecting a substantially symmetric core array geometry to reduce said optimization step to optimizing i) core width/core spacing, and ii) angle of orientation of core array with respect to incoming radiation.

6. A method of designing multicore optical fibers according to claim 1, further comprising the step of selecting the index of refraction surrounding the fiber as a function of the index of refraction of fiber.

7. A method of designing multicore optical fibers according to claim 6, said selecting step further comprising the step of matching the surrounding index of refraction to the fiber index of refraction thereby causing incoming radiation to pass through the fiber substantially unrefracted.

8. A method of designing multicore optical fibers according to claim 1, wherein said fiber includes at least seven cores.

9. A method of designing multicore optical fibers according to claim 1, said optimizing step further comprising, for twisted fiber, optimizing effective length for no shadowing and twist rate of the fiber.

* * * * *